US012646740B2

(12) United States Patent
Mohtadi et al.

(10) Patent No.: US 12,646,740 B2
(45) Date of Patent: Jun. 2, 2026

(54) BORON CONTAINING ELECTROLYTES AND METHODS OF FORMING BORON CONTAINING ELECTROLYTES FOR MAGNESIUM BATTERIES

(71) Applicant: Toyota Motor Engineering & Manufacturing North America, Inc., Plano, TX (US)

(72) Inventors: Rana Mohtadi, Northville, MI (US); Oscar Tutusaus, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 894 days.

(21) Appl. No.: 17/675,906

(22) Filed: Feb. 18, 2022

(65) Prior Publication Data

US 2022/0263116 A1    Aug. 18, 2022

Related U.S. Application Data

(60) Provisional application No. 63/150,652, filed on Feb. 18, 2021.

(51) Int. Cl.
H01M 10/056 (2010.01)
H01M 10/36 (2010.01)

(52) U.S. Cl.
CPC ......... H01M 10/056 (2013.01); H01M 10/36 (2013.01); *H01M 2300/0028* (2013.01);
(Continued)

(58) Field of Classification Search
CPC ............... H01M 10/056; H01M 10/36; H01M 2300/0028; H01M 2300/0045; H01M 2300/0065; H01M 4/38
See application file for complete search history.

(56) References Cited

U.S. PATENT DOCUMENTS 9,455,473 B1 *  9/2016  Mohtadi ........... H01M 10/0569
9,755,269 B2    9/2017  Casteel, Jr. et al.
(Continued)

FOREIGN PATENT DOCUMENTS

EP              3651252 A1 *  5/2020  .......... C01B 35/026
WO      WO-2017024023 A1 *  2/2017  .......... B01J 31/2273

OTHER PUBLICATIONS

Geirhos et al. (Year: 2015).*
(Continued)

*Primary Examiner* — Tong Guo
*Assistant Examiner* — Katherine J Metzger
(74) *Attorney, Agent, or Firm* — Christopher G. Darrow; DARROW MUSTAFA PC

(57) ABSTRACT

A method of forming an electrolyte includes combining a magnesium closo-borate-organic solvent salt with an organic cation-anion salt, and removing the organic solvent from the magnesium closo-borate-organic solvent salt and to form an electrolyte comprising a magnesium closo-borate salt/organic cation-anion salt mixture. The magnesium closo-borate salt can have the structure $Mg(C_yB_{a-y}H_{a-z}X_z)_{(2-(1-y))}$ where: y is 0 or 1; a is 10 or 12; z is 0 to a; and X is independently halogen, alkyl, alkoxy, acyl, aryl, alkylaryl, arylalkyl, and/or aryloxy substituents and wherein alkyl groups can be linear, branched, or cyclic. Also, any of the substituents can be partially or fully halogenated.

20 Claims, 10 Drawing Sheets

(52) U.S. Cl.
CPC .............. *H01M 2300/0045* (2013.01); *H01M 2300/0065* (2013.01)

(56) References Cited

U.S. PATENT DOCUMENTS

| | | | | |
|---|---|---|---|---|
| 2012/0202121 A1* | 8/2012 | Richard | ............ | H01M 10/0567 429/207 |
| 2016/0372786 A1* | 12/2016 | Udovic, IV | ....... | H01M 10/0562 |
| 2017/0299932 A1* | 10/2017 | Wang | ..................... | G02F 1/1525 |
| 2019/0235341 A1* | 8/2019 | Wang | ..................... | G02F 1/163 |
| 2019/0278147 A1* | 9/2019 | Wang | ..................... | G02F 1/163 |
| 2020/0381776 A1 | 12/2020 | Mohtadi et al. | | |
| 2020/0381777 A1 | 12/2020 | Mohtadi et al. | | |
| 2022/0017375 A1 | 1/2022 | Tutusaus et al. | | |

OTHER PUBLICATIONS

Geirhos et al., "Communication: Conductivity Enhancement in Plastic-Crystalline Solid-State Electrolytes," J. Chem. Phys. 143, 2015, 4 pages.

Jin et al., "An organic ionic plastic crystal electrolyte for rate capability and stability of ambient temperature lithium batteries," Energy Environ. Sci., 2014, vol. 7, No. 10, pp. 3352-3361.

Iranipour et al., "Effect of secondary phase on thermal behaviour and solid-state ion conduction in lithium doped Nethyl-N-methylpyrrolidinium tetrafluoroborate organic ionic plastic crystal," J. Mater. Chem. A, 2017, vol. 5, pp. 24909-24919.

* cited by examiner

BORON CONTAINING ELECTROLYTES AND METHODS OF FORMING BORON CONTAINING ELECTROLYTES FOR MAGNESIUM BATTERIES

CROSS REFERENCE TO RELATED APPLICATIONS

This application claims benefit of U.S. Provisional Application No. 63/150,652 filed on Feb. 18, 2021, which is herein incorporated by reference in its entirety.

TECHNICAL FIELD

The present disclosure generally relates to electrolytes, and particularly to electrolytes for magnesium batteries.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Solid-state electrolytes provide many advantages in secondary battery design, including mechanical stability, no volatility, and ease of construction. Typical inorganic solid-state electrolytes having high ionic conductivity are hard materials that can fail due to insufficient contact with the electrode materials after battery cycling. Polymeric and other organic solid-state electrolytes overcome contact failure on cycling because of their "soft" nature. Unfortunately, these electrolytes typically display poor ionic conductivity.

Accordingly, to realize robust and optimally conductive solid-state electrolytes that overcome the problems of lithium closo-borate salts, a magnesium closo-borate salt based soft electrolyte that is free of ethers with high conductivity is desirable.

SUMMARY

In one form of the present disclosure, a method of forming an electrolyte includes combining a magnesium closo-borate-organic solvent salt with an organic cation-anion salt, and removing the organic solvent from the magnesium closo-borate-organic solvent salt to form an electrolyte comprising a magnesium closo-borate salt/organic cation-anion salt mixture.

In some variations, the magnesium closo-borate salt has the structure $Mg(C_yB_{a-y}H_{a-z}X_z)_{(2-(1-y))}$ where: y is 0 or 1; a is 10 or 12; z is 0 to a; and X is independently halogen, alkyl, alkoxy, acyl, aryl, alkylaryl, arylalkyl, and/or aryloxy substituents and wherein alkyl groups can be linear, branched, or cyclic. And in such variations, any substituent can be partially or fully halogenated.

In at least one variation, the organic cation-anion salt includes an organic cation selected from ammonium or phosphonium ions of the structure $[(CR^1R^2)_n]_wZ(R^3)_{4-2w}{}^+$ and where: n is 4 to 6; w is 0 to 2; $R^3$ groups are independently $C_1$-$C_8$ alkyl or $C_6$-$C_{10}$ aryl unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy. And in some variations, the carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and any alkyl or alkoxy group is linear, branched, or cyclic.

In some variations, the organic cation-anion salt includes an anion selected from at least one of a closo-borate anion, organo borate, organo aluminate, $F^-$, $Cl^-$, $Br^-$, $I^-$, $R_xBF_{4-x}{}^-$, $R_yPF_{6-y}{}^-$, $SbF_6{}^-$, $ClO_4{}^-$, $SO_4{}^{-2}$, $N(SO_2F)_2{}^-$, $N(SO_2(CF_2)_n(CF_3)_2{}^-$, $[NSO_2(CF_2)_{n+1}SO_2]^-$, $CF_3(CF_2)_nSO_3{}^-$, where: n is 0 to 5; x is 0 to 4; y is 0 to 6; and R is a linear, branched, or cyclic alkyl group that can be unsubstituted, partially fluorinated, or fully fluorinated.

In at least one variation, the method further includes synthesizing the magnesium closo-borate by mixing a protonated amine or phosphine closo-borate with at least one magnesium amide, phosphide, carbanion, silicon anion, hydride anion or complex hydride anion in a solvent. The protonated amine or phosphine closo-borate includes at least one protonated ammonia, primary, secondary, or tertiary amine or phosphine of the structure $R^1R^2R^3ZH^+$ and at least one closo-borate anion of the structure $C_yB_{a-y}H_{a-z}X_z{}^{(-2+y)}$. The at least one protonated ammonia, primary, secondary, or tertiary amine or phosphine has the structure $R^1R^2R^3ZH^+$ where: Z is N or P; and $R^1$, $R^2$, and $R^3$ are independently hydrogen or a one to ten carbon alkyl, aryl, alkylaryl, trialkylsilyl, or aryldialkylsilyl groups. Also, the at least one closo-borate anion has the structure $C_yB_{a-y}H_{a-z}X_z{}^{(-2+y)}$ where: y is 0 or 1; a is 10 or 12; and X is independently halogen, alkyl, alkoxy, acyl, aryl, alkylaryl, arylalkyl, and/or aryloxy substituents and wherein alkyl groups can be linear, branched, or cyclic, and any substituent can be partially or fully halogenated. In some variations, the magnesium amide or phosphide has the structure: $R^4R^5Z^-$, where: Z is N or P; and $R^4$ and $R^5$ are independently a one to eight carbon alkyl, aryl, alkylaryl, trialkylsilyl, or aryldialkylsilyl group.

In at least one variation, the carbanion of the magnesium+carbanion can be an alkyl (linear, cyclic, branched), aryl, alkylaryl (linear, cyclic, branched,), arylalkyl (linear, cyclic, branched,), ylide, acetylide (and substituted acetylides), ethynilide (and substitute ethynilides), or heteroaromatic anion (substituted with any number of linear, cyclic, branched, aryl, alkyl, alkylaryl, arylakyl groups). For example, the magnesium+carbanion can be one or more of magnesium carbide, magnesium (trimethylsilyl) acetylide, dibutylmagnesium, magnesocene, bis(trimethylsilylmethyl) magnesium, bis(fluorenyl)magnesium, bis((trimethylsilyl) methyl)magnesium, magnesium bis(9Hthioxanthen-9-ide), bis(2-thiazolyl)magnesium.

In some variations, the silicon anion of the magnesium+silicon anion can be silicide or silanide (substituted with linear, cyclic, branched alkyl and/or aryl groups). For example, the magnesium+silicon anion can be one or more of magnesium silicide, bis(dimethylphenylsilyl)magnesium, bis(triphenylsilyl)magnesium, and bis(tert-butyldiphenylsilyl)magnesium.

In at least one variation, the hydride and/or complex hydride anion (also referred to herein simply as "hydride anion") of the magnesium+hydride anion can be a hydride, including aluminum hydrides, or a borohydride. For example, the magnesium+hydride anion can be one or more of magnesium hydride, magnesium borohydride, magnesium aluminum hydride, magnesium triethylborohydride, and magnesium triisopropoxyborohydride.

A reaction between at least one protonated amine or phosphine and the magnesium amide, phosphide carbanion, or silicon anion forms the magnesium closo-borate. And the method further includes removing the organic solvent from the magnesium closo-borate-organic solvent salt by removing one or more byproduct amines from the at least one protonated amine or phosphine and the at least one magnesium amide or phosphide.

In some variations, the magnesium closo-borate salt/organic cation-anion salt mixture is free of solvent.

In at least one variation, the method further includes mixing the magnesium closo-borate salt/organic cation-anion salt mixture with an organic plastic crystal and forming a soft solid electrolyte. And in such variations, the organic plastic crystal can be a succinonitrile-glutaronitrile mixture. The organic plastic crystal can be from about 10 wt. % to about 70 wt. % of the soft solid electrolyte and the soft solid electrolyte can include between about 0.01 mole fraction and about 0.9 mole fraction of at least one magnesium conductivity enhancing anion.

In another form of the present disclosure, an electrolyte with at least one magnesium closo-borate salt, at least one organic cation-anion salt, and an organic plastic crystal. The at least one magnesium closo-borate salt has the structure $Mg(C_yB_{a-y}H_{a-z}X_z)_{(2-(1-y))}$ where: y is 0 or 1; a is 10 or 12; z is 0 to a; and X is independently halogen, alkyl, alkoxy, acyl, aryl, alkylaryl, arylalkyl, and/or aryloxy substituents. In some variations, alkyl groups can be linear, branched, or cyclic, and any substituent can be partially or fully halogenated.

The at least one organic cation-anion salt includes at least one organic cation selected from ammonium or phosphonium ions and having the structure $[(CR^1R^2)_n]_wZ(R^3)_{4-2w}^+$ where: n is 4 to 6; w is 0 to 2; $R^3$ groups are independently $C_1$-$C_8$ alkyl or $C_6$-$C_{10}$ aryl unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy; any alkyl or alkoxy group is linear, branched or cyclic; and $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy. In some variations the carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and any alkyl or alkoxy group is linear, branched, or cyclic.

The at least one closo-borate anion has the structure $C_yB_{a-y}H_{a-z}X_z^{(-2+y)}$ where: y is 0 or 1; a is 10 or 12; z is 0 to a; and X is independently halogen, alkyl, alkoxy, acyl, aryl, alkylaryl, arylalkyl, and/or aryloxy substituents and wherein alkyl groups can be linear, branched, or cyclic, and any substituent can be partially or fully halogenated.

In some variations, the organic plastic crystal includes a succinonitrile-glutaronitrile mixture and the succinonitrile-glutaronitrile mixture is about 15 to about 96 mole % glutaronitrile. And in at least one variation, the organic plastic crystal is about 10 to about 70 weight percent of the electrolyte.

In some variations, w=0 or 1, and there is a plurality of $R^3$ groups. In such variations, the $R^3$ groups can be the same, the $R^3$ groups contain at least one chiral center and combined $R^3$ groups are racemic or comprises diastereomers.

In at least one variation, w=2 and $[(CR^1R^2)_n]_2Z^+$ includes a spiro-ammonium or a spiro-phosphonium ion, and the spiro-ammonium or a spiro-phosphonium ion, at least one of the $CR^1R^2$ of the $[(CR^1R^2)_n]_2Z^+$ has an $R^1$ group different from an $R^2$ group and includes a chiral center, or at least one of the $CR^1R^2$ of the $[(CR^1R^2)_n]_2Z^+$ has an $R^1$ group different from an $R^2$ group and comprises a plurality of diastereomers.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

Figure 1:
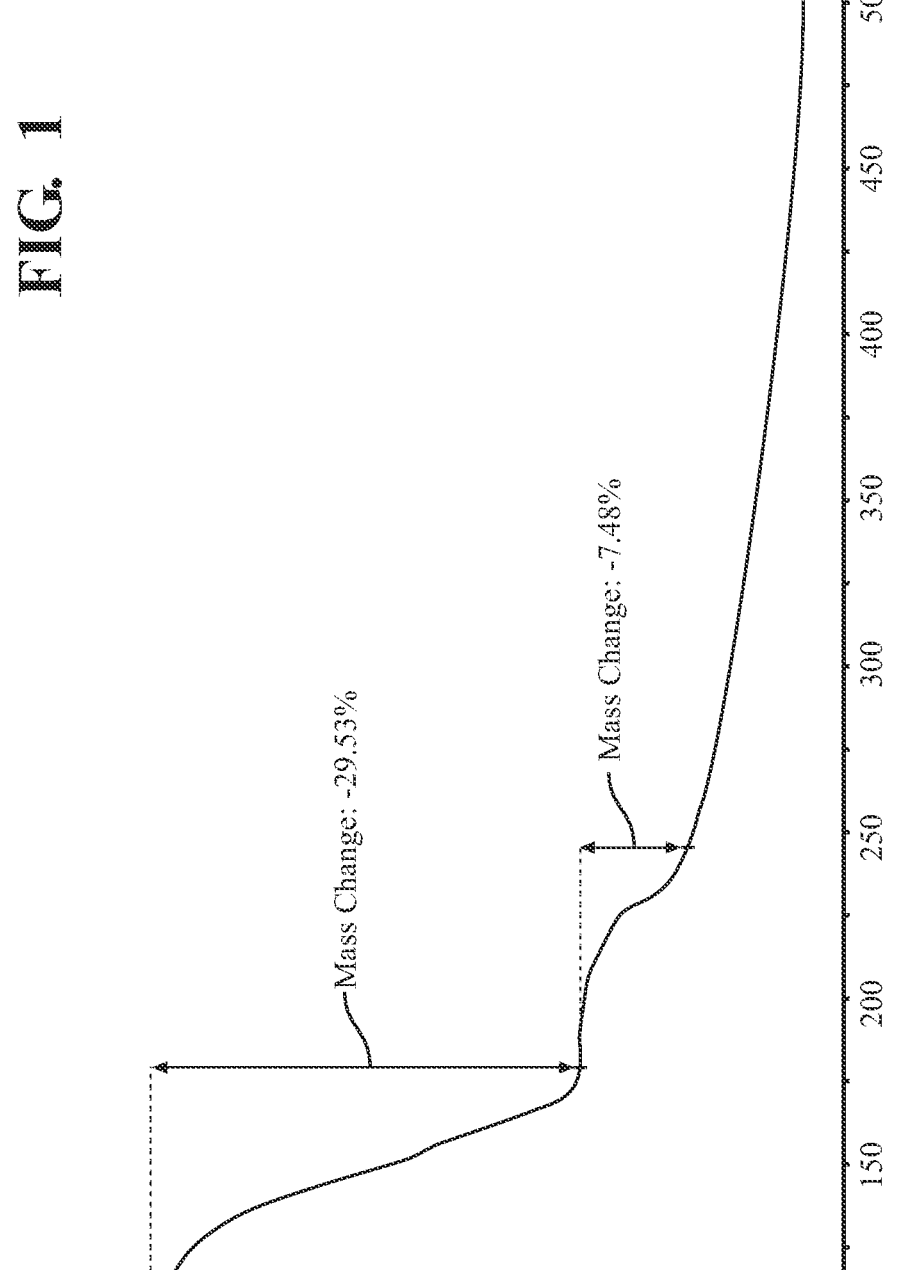
FIG. 1 is a thermogravimetric plot of weight loss vs. temperature showing the loss of tetrahydrofuran (THF) from for $Mg(THF)_6(CB_{11}H_{12})_2$ when $Mg(THF)_6(CB_{11}H_{12})_2$ is heated in argon.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides electrolytes that include a composite salt with a combination of one or more stable and solvent free large magnesium closo-borate salts (also referred to herein as "$Mg^{+2}$ salts") and one or more organic cation-anion salts with anions including closo-borate anions, organo borate, organo aluminate, $F^-$, $Cl^-$, $Br^-$, $I^-$, $R_xBF_{4-x}^-$, $R_yPF_{6-y}^-$, $SbF_6^-$, $ClO_4^-$, $SO_4^{-2}$, $N(SO_2F)_2^-$, $N(SO_2(CF_2)_n CF_3)_2^-$, $[NSO_2(CF_2)_{n+1}SO_2]^-$, and/or $CF_3(CF_2)_n SO_3^-$, where: n is 0 to 5; x is 0 to 4; y is 0 to 6; and R is a linear, branched, or cyclic alkyl group that can be unsubstituted, partially fluorinated, or fully fluorinated. Also, and in addition to being organic solvent free, the electrolytes according to the teachings of the present disclosure display high cation mobilities and high stability.

The closo-borate anion of the magnesium closo-borate salt can be the same or different than the closo-borate anion of the organic cation-anion salt. And an electrolyte formulation with the composite magnesium closo-borate/organic cation closo-borate salt can include multiple different closo-borate anions and multiple different organic cations. The mole percentage of $Mg^{+2}$ cations of the total cations in the electrolyte can be from about five to about 95 percent and the mole percentage of closo-borate anions of all anions of the electrolyte can be from about five to about 95 percent. Additionally, closo-borate Mg salt can be combined with organic cation-anion salts where the anion can be an organo borate, organo aluminate, $F^-$, $Cl^-$, $Br^-$, $I^-$, $R_xBF_{4-x}^-$, $R_y PF_{6-y}^-$, $SbF_6^-$, $ClO_4^-$, $SO_4^{-2}$, $N(SO_2F)_2^-$, $N(SO_2(CF_2)_n CF_3)_2^-$, $[NSO_2(CF_2)_{n+1}SO_2]$, $CF_3(CF_2)_n SO_3^-$, where: n is 0 to 5; x is 0 to 4; y is 0 to 6; and R is a linear, branched, or cyclic alkyl group that can be unsubstituted, partially fluorinated, or fully fluorinated.

In some variations, one or more organic cation-anion salts included in the composite are selected to have ammonium or phosphonium ions of the structure $[(CR^1R^2)_n]_w Z(R^3)_{4-2w}^+$, where: n is 4 to 6; w is 0 to 2; $R^3$ groups are independently $C_1$-$C_8$ alkyl or $C_6$-$C_{10}$ aryl unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy, where the carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; when w is 0 or 1, the $R^3$ groups include at least two different structures or when all $R^3$ groups are the same, $R^3$ group contains a chiral center but the combined $R^3$'s are racemic; and when w is 2 the two $[(CR^1R^2)_n]Z^+$ cyclic structures of the spiro-ammonium or phosphonium ion are different or when the two $[(CR^1R^2)_n]Z^+$ cyclics are the same at least one of the $CR^1R^2$ has different $R^1$ and $R^2$ groups and the $R^1$ and $R^2$ groups are randomly situated on both faces of the structure, for example randomly situated in axial and equatorial position of n=5 cyclic. The Z atom can be, but is not necessarily, a chiral center or any of $R^1$, $R^2$ or $R^3$ groups can have, but is not necessarily, have one or more chiral centers. A plurality of different organic cations can be combined with one or more closo-borate anions to constitute the organic cation-anion salt.

In some variations, the magnesium closo-borate salt/organic cation closo-borate salt mixture (also referred to herein simply as "magnesium closo-borate/organic cation closo-borate salt") can include one or more additional magnesium cation and/or organic cation conductivity enhancing anion salts in an effectively solvent-free combined salt. The mole fraction of the conductivity enhancing anion to the total anions in the combined salt can be from about 0.01 to about 0.9 in the combined salt. The conductivity enhancing anion can be $F^-$, $Cl^-$, $Br^-$, $I^-$, $R_xBF_{4-x}^-$, $R_yPF_{6-y}^-$, $SbF_6^-$, $ClO_4^-$, $SO_4^{-2}$, $N(SO_2F)_2^-$, $N(SO_2(CF_2)_n CF_3)_2^-$, $[NSO_2(CF_2)_n{}_{+1}SO_2]$, $CF_3(CF_2)_n SO_3^-$, where: n is 0 to 5; x is 0 to 4; y is 0 to 6; and R is a linear, branched, or cyclic alkyl group that can be unsubstituted, partially fluorinated, or fully fluorinated.

In at least one variation, the electrolyte can be formulated from the combined magnesium closo-borate/organic cation closo-borate salt with the addition of an organic plastic crystal to form a soft solid electrolyte with appreciable Mg conductivities. The organic plastic crystal material can be a succinonitrile-glutaronitrile mixture where the mole percent of glutaronitrile is 15 to 96 mole %. The plastic state promotes $Mg^{+2}$ conductivities of more than $10^{-7}$ S/cm at 60° C. The electrolyte can include the combined magnesium closo-borate/organic cation closo-borate salt with the magnesium cation and/or organic cation conductivity enhancing anion salts and the organic plastic crystal.

In some variations, provided herein, the composite magnesium closo-borate/organic cation closo-borate salt is included in a solid-state electrolyte for a solid-state electrochemical device. Additionally, the electrolyte includes the magnesium cation and/or organic cation conductivity enhancing anion salt(s) and the organic plastic crystal material. Accordingly, provided herein, is an electrochemical device that includes an anode; a cathode; and a solid-state electrolyte that is the mixed alkali metal or alkali earth metal closo-borate/conductivity enhancing anion salt in contact with the anode and the cathode. The electrochemical device can be a secondary battery or a subunit of a secondary battery. The anode is an electrode where alkali metal or alkali earth metal oxidation occurs during the device's discharge and where reduction occurs during the device's charge. Similarly, the cathode is an electrode where a cathode material reduction occurs during the device's discharge and a cathode material oxidation occurs during the device's charge.

In one form of the present disclosure, a method of preparing a composite magnesium closo-borate/organic cation closo-borate salt is provided. The method includes subsequent removal of solvent employed to synthesize the magnesium closo-borate and the removal of the solvent is enhanced due to the presence of the organic cation closo-borate in the mixed salt. The magnesium closo-borate salt and the organic cation closo-borate salt can be prepared separately and subsequently mixed, or the combined salts can be formed simultaneously and separated from reaction by-products and solvent to yield the composite magnesium closo-borate/organic cation closo-borate salt. Preparation can be by metathesis, either with a bound or unbound salt or by an acid-base reaction between an acidic cation closo-borate with a magnesium basic anion salt.

In another form of the present disclosure, the composite magnesium closo-borate/organic cation closo-borate salt is included in a soft electrolyte for a solid-state electrochemical device. Additionally, the soft electrolyte can include the magnesium cation and/or organic cation conductivity enhancing anion salt(s) in addition to the organic plastic crystal material. Accordingly, provided herein, is an electrochemical device that includes an anode; a cathode; and a soft electrolyte that is the composite magnesium closo-borate/organic cation closo-borate salt in the organic plastic crystal in contact with the anode and the cathode. The electrochemical device can be a secondary battery or a subunit of a secondary battery. The anode is an electrode where magnesium oxidation occurs during the device's discharge and where reduction occurs during the device's charge. Similarly, the cathode is an electrode where a cathode material reduction occurs during the device's discharge and a cathode material oxidation occurs during the device's charge.

In some variations, synthesis of a magnesium closo-borate/organic cation closo-borate salt according to the teachings of the present disclosure is carried out to form $Mg(C_yB_{a-y}H_{a-z}X_z)_{(2-(1-y))}$ where: y is 0 or 1; a is 10 or 12; z is 0 to a; and X is independently halogen, alkyl, alkoxy, acyl, aryl, alkylaryl, arylalkyl, and/or aryloxy substituents and wherein alkyl groups can be linear, branched, or cyclic, and wherein any substituent can be partially or fully halogenated. The synthesis can be carried out by the combining a magnesium amide, phosphide, carbanion, silicon anion, hydride or complex hydride with a protonated amine or phosphine ammonium closo-borate in solution where an acid-base reaction results in the magnesium closo-borate with an amine from the amide and an amine from the protonated ammonium salt. The ammonium cation can be protonated ammonia, primary, secondary or tertiary amine or a phosphine of the structure $R^1R^2R^3ZH^+$, where: Z is N or P; and $R^1$, $R^2$, and $R^3$ are independently hydrogen or a one to ten carbon alkyl, aryl, alkylaryl, trialkylsilyl, or aryldialkylsilyl groups. The ammonium ion can be a pyridinium ion or any other protonated aromatic or non-aromatic nitrogen heterocycle amine or phosphine. The base can be any amide (azanide), or phosphide of an alkali metal or alkali earth metal of the structure $R^4R^5Z^-$ where: Z is N or P; and $R^4$ and $R^5$ are independently a one to eight carbon alkyl, aryl, alkylaryl, trialkylsilyl, or aryldialkylsilyl groups that is soluble in an amine, phosphine, thioether, or any other solvent or mixed solvent, including non-polar solvents where solubility can be imparted by its affinity with the base structure rather than or in addition to an affinity for the cation.

The synthesis can be by the metathesis of a salt having the magnesium cation and a byproduct anion and a salt having a byproduct cation and the closo-borate. After combining the salts in solution, the magnesium closo-borate is separated from the byproduct cation-byproduct anion salt. The magnesium closo-borate can be separated by its selective precipitation from solution or its retention in solution with the selective precipitation of the byproduct cation-byproduct anion salt. The byproduct cation, or the byproduct anion can be attached to a polymer or resin, and the magnesium closo-borate can be eluted from the byproduct cation-byproduct anion bound to the polymer or resin.

In general, the solvent used in the synthesis of the magnesium closo-borate salt is not a potential bidentate ligand or polydentate ligand, which chelates the magnesium cation of the magnesium closo-borate salt of the combined magnesium closo-borate/organic cation closo-borate salt. The solvent can be selected to have a boiling point of 250° C. or less, for example 200° C. or less, 150° C. or less, or 100° C. or less depending upon the organic cation closo-borate salt employed, as thermal decomposition of the organic cation and/or the closo-borate, or reaction with the closo-borate and the solvent ligand, are possible at sufficiently high temperatures. The solvent is evaporated upon heating at about one atmosphere pressure or can be removed at a reduced pressure. Solvents can be thioethers, amines, phosphines, and hydrocarbons.

Removal of the amine by-products can be carried out by contacting with an acid, for example a Lewis or Bronsted acid resin or polymer, by evaporation from the magnesium closo-borate/organic cation closo-borate salt solution, or by any other means. When the organic cation closo-borate is insoluble in one solvent, the precipitation of the composite magnesium closo-borate/organic cation closo-borate salt can be carried out by combining with that solvent for precipitation and reduction of the quantity of solvent that must be evaporated from the salt mixture to achieve a solvent-free salt mixture. Subsequently, solvent is removed by evaporation from the combined magnesium closo-borate/organic cation closo-borate salt. In fact, it has been discovered that the removal of the solvent in the presence of the organic cation closo-borate salt is much more effective than for a magnesium closo-borate absent the organic cation closo-borate as discussed in greater detail below.

The relative ease at removing the organic solvent from a magnesium closo-borate salt can be dependent on the organic solvent. For example, FIGS. 1-5 show the effectiveness (i.e., lack of effectiveness) of removing various organic solvents from $Mg(CB_{11}H_{12})_2$ using traditional heating of a $Mg(CB_{11}H_{12})_2$ plus organic solvent mixture.

Referring to FIG. 1, the difficulty of removing the solvent tetrahydrofuran (THF) from $Mg(THF)_6(CB_{11}H_{12})_2$ is shown. Particularly, $Mg(THF)_6(CB_{11}H_{12})_2$ was subjected to thermogravimetric analysis by heating the $Mg(THF)_6(CB_{11}H_{12})_2$ in argon to 500° C. And as observed in FIG. 1, heating the $Mg(THF)_6(CB_{11}H_2)_2$ to about 200° C. resulted in a mass loss of about 29.5%, which is equivalent to the loss of about three THF ligands from the $Mg^{+2}$ cation, and heating the $Mg(THF)_6(CB_{11}H_{12})_2$ to about 250° C. resulted in a mass loss of about 37.0%, or about four THF/Mg. And when heated to about 500° C., the $Mg(THF)_6(CB_{11}H_{12})_2$ has a total mass loss of about 44.4%. In contrast, the expected mass loss for complete removal of the THF solvent from $Mg(THF)_6(CB_{11}H_{12})_2$ is 58.2%.

Figure 2:
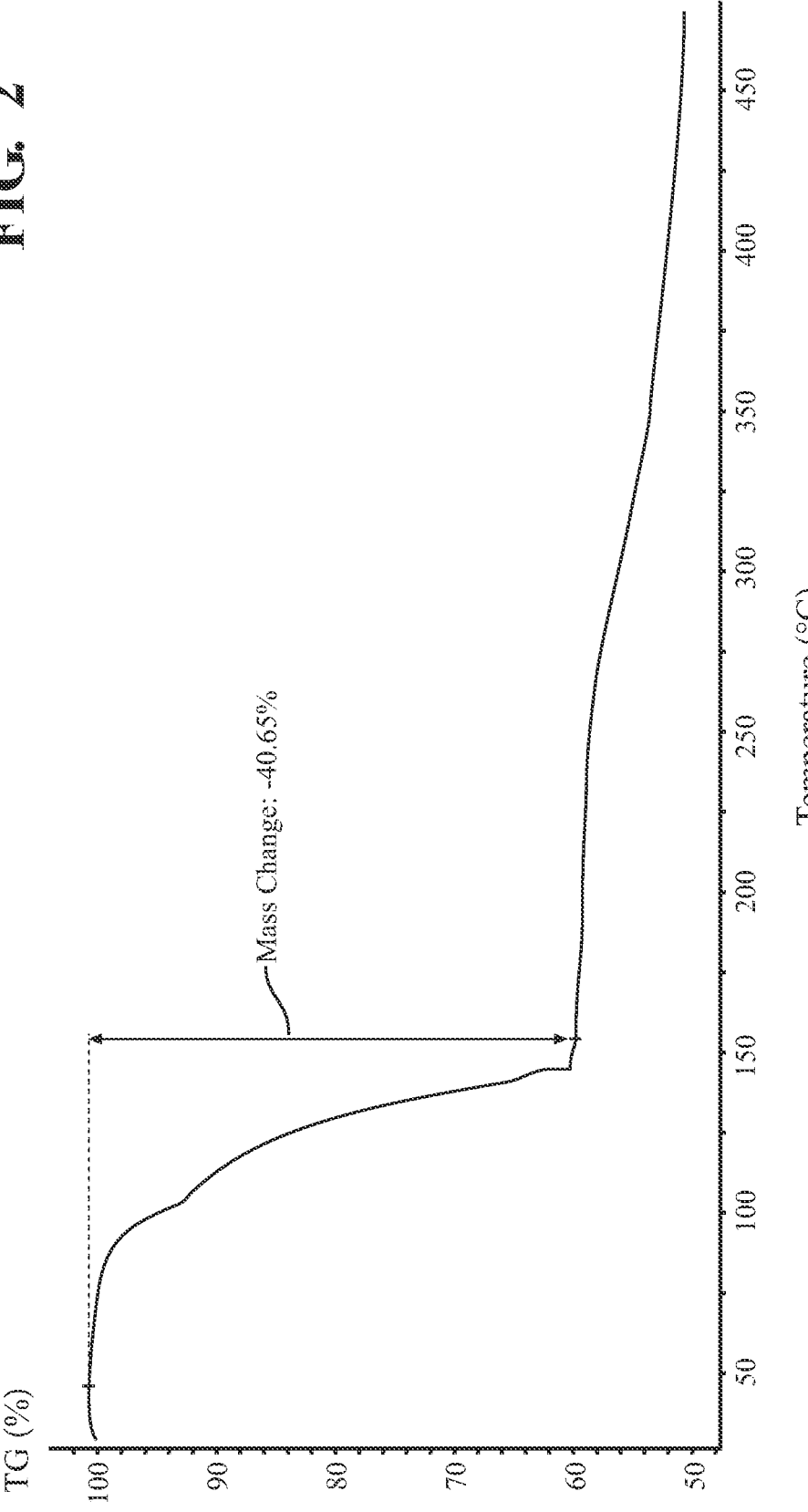
FIG. 2 is a thermogravimetric plot of weight loss vs. temperature showing the loss of dioxolane (DOL) from $Mg(DOL)_6(CB_{11}H_{12})_2$ when $Mg(DOL)_6(CB_{11}H_{12})_2$ is heated in argon.

Regarding removal of the solvent dioxolane (DOL) from $Mg(DOL)_6(CB_{11}H_{12})_2$, FIG. 2 shows the thermogravimetric analysis of heating $Mg(DOL)_6(CB_{11}H_{12})_2$ in argon to about 450° C. And as observed in FIG. 2, heating the $Mg(DOL)_6(CB_{11}H_{12})_2$ to about 140° C. results in a mass loss of about 40.65%, and continued heating to 500° C. results in a total mass loss of about 49%. In contrast, the expected mass loss for complete removal of the DOL solvent from $Mg(DOL)_6(CB_{11}H_{12})_2$ is 58.9%.

Figure 3:
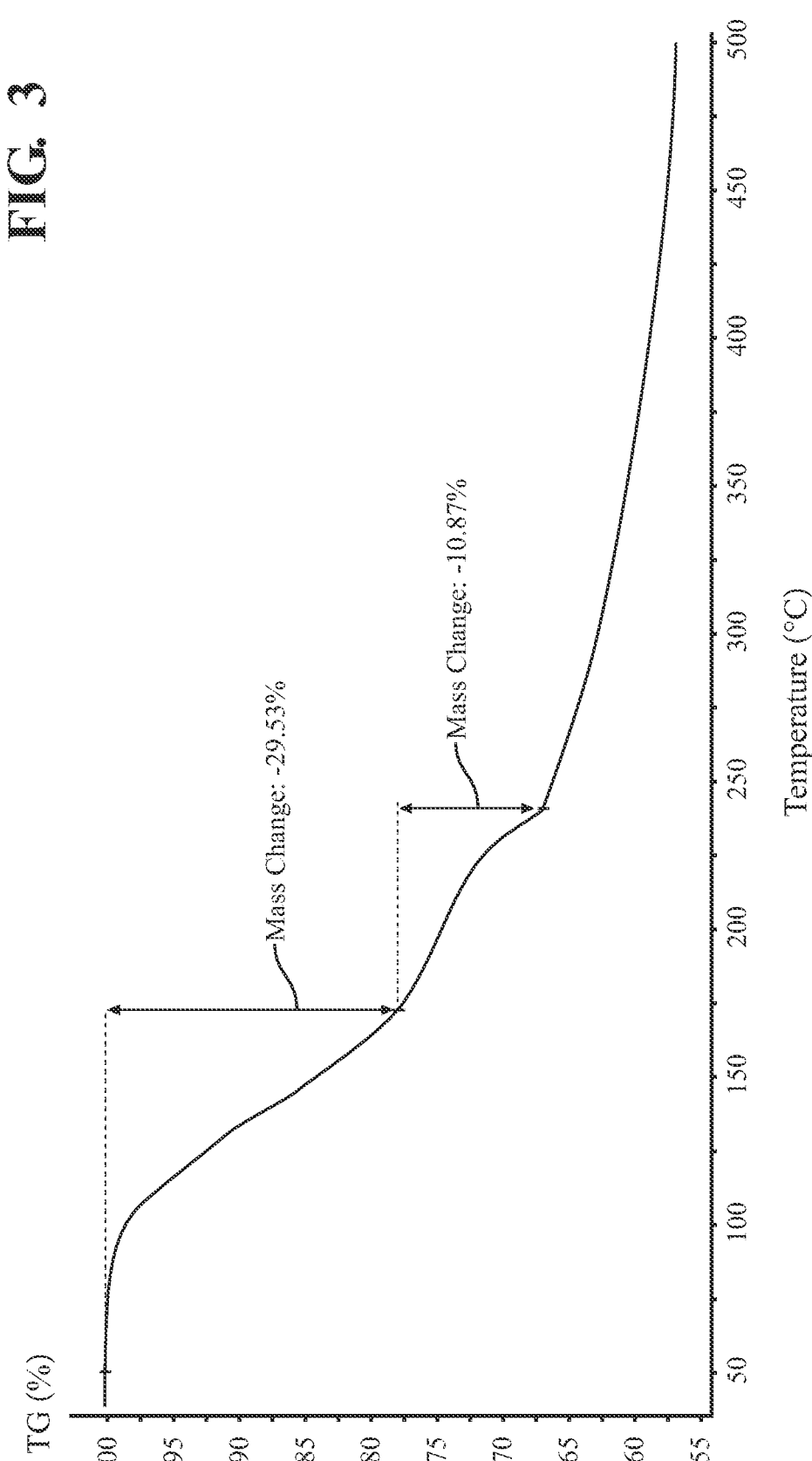
FIG. 3 is a thermogravimetric plot of weight loss vs. temperature showing the loss of tetrahydropyran (THP) from $Mg(THP)_6(CB_{11}H_{12})_2$ when $Mg(THP)_6(CB_{11}H_{12})_2$ is heated in argon.

Regarding removal of the solvent of tetrahydropyran (THP) from $Mg(THP)_6(CB_{11}H_{12})_2$, FIG. 3 shows the thermogravimetric analysis of heating $Mg(THP)_6(CB_{11}H_{12})_2$ in argon to about 500° C. And as observed in FIG. 3, heating the $Mg(THP)_6(CB_{11}H_{12})_2$ to about 170° C. results in a mass loss of about 22.2%, continued heating to about 240° C. results in an additional mass loss of about 10.9%, and heating to about 500° C. results in a total mass loss of about 43%. In contrast, the expected mass loss for complete removal of the THP solvent from $Mg(THP)_6(CB_{11}H_{12})_2$ is 62.5%.

Figure 4:
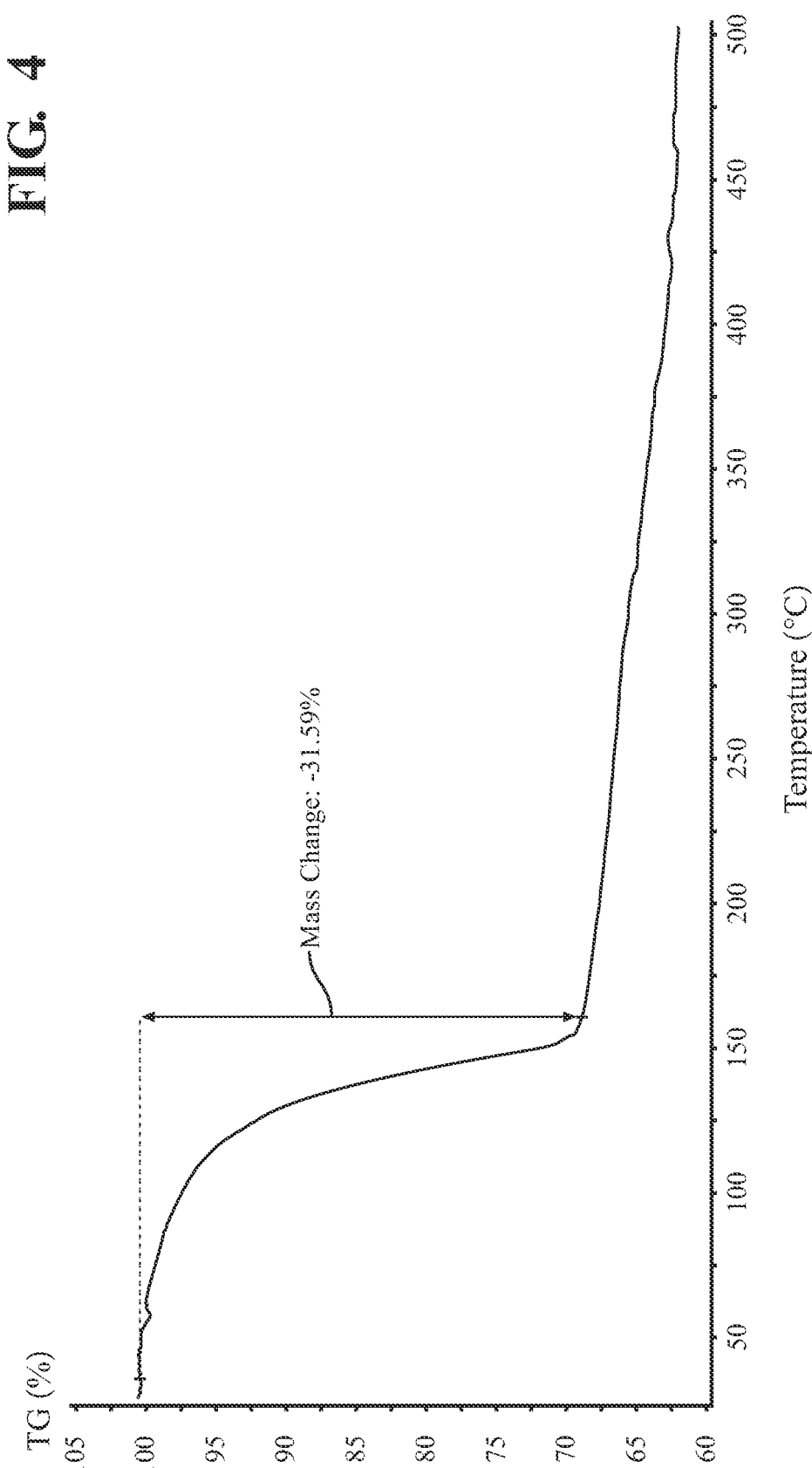
FIG. 4 is a thermogravimetric plot of weight loss vs. temperature for showing the loss of nitromethane $(CH_3NO_2)$ from $Mg(CH_3NO_2)_6(CB_{11}H_{12})_2$ when $Mg(CH_3NO_2)_6(CB_{11}H_{12})_2$ is heated in argon.

Regarding removal of the solvent nitromethane $(CH_3NO_2)$ from $Mg(CH_3NO_2)_6(CB_{11}H_{12})_2$, FIG. 4 shows the thermogravimetric analysis of heating $Mg(CH_3NO_2)_6$ $(CB_{11}H_{12})_2$ in argon to about 500° C. And as observed in FIG. 4, heating the $Mg(CH_3NO_2)_6(CB_{11}H_{12})_2$ to about 160° C. results in a mass loss of about 31.59% and continued heating to 500° C. results in a total mass loss of about 38%. In contrast, the expected mass loss for complete removal of $CH_3NO_2$ solvent from $Mg(CH_3NO_2)_6(CB_{11}H_{12})_2$ is 54.1%.

Figure 5:
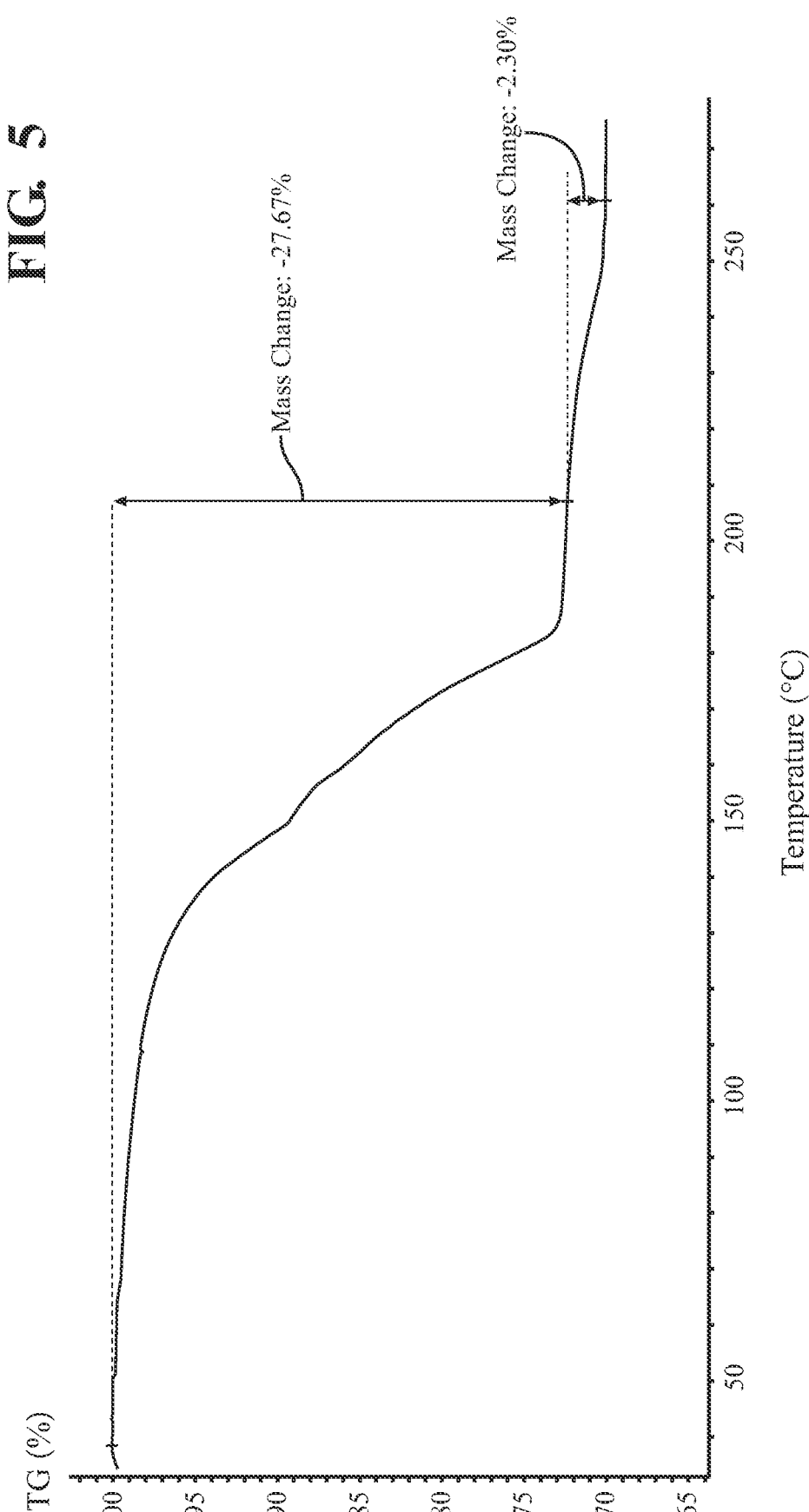
FIG. 5 is a thermogravimetric plot of weight loss vs. temperature showing the loss of dimethyl sulfide $(S(CH_3)_2)$ from $Mg(S(CH_3)_2)_2(CB_{11}H_{12})_2$ when $Mg(S(CH_3)_2)_2(CB_{11}H_{12})_2$ is heated in argon.

Regarding removal of the solvent dimethyl sulfide $(S(CH_3)_2)$ from $Mg(S(CH_3)_2)_2(CB_{11}H_{12})_2$, FIG. 5 shows the thermogravimetric analysis of heating $Mg(S(CH_3)_2)_2$ $(CB_{11}H_{12})_2$ in argon to about 270° C. And as observed in FIG. 5, heating the $Mg(S(CH_3)_2)_2(CB_{11}H_{12})_2$ to about 185° C. results in a mass loss of about 27.67% which is slightly less than an expected mass loss of 28.6% for complete removal of $(S(CH_3)_2)$ solvent from $Mg(S(CH_3)_2)_2$ $(CB_{11}H_{12})_2$. However, continued heating to 270° C. resulted in a total mass loss of about 30% loss which is greater than the expected mass loss of 28.6%. That is, the $(S(CH_3)_2)$ solvent is easier to remove from the Mg $(CB_{11}H_{12})_2$ salt than the THF, DOL, THP, and $CH_3NO_2$ solvents, however, reaction products between the $S(CH_3)_2$ solvent and the Mg $(CB_{11}H_{12})_2$ salt appear to be formed and removed from the $Mg(CB_{11}H_{12})_2$ salt since continued heating results in a mass loss greater than expected for the complete removal of the $S(CH_3)_2$ solvent.

In an effort to understand the removal of $(S(CH_3)_2)$ and/or the interaction of $(S(CH_3)_2)$ with $CB_{11}H_{12}$ anion during heating of $Mg(S(CH_3)_2)_2(CB_{11}H_{12})_2$, nuclear magnetic resonance (NMR) spectroscopy of $Mg(S(CH_3)_2)_2$ $(CB_{11}H_{12})_2$ after being synthesized, after being heated to 190° C. and cooled to room temperature (i.e., between 20-25° C.), and after being heated to 300° C. and cooled to room temperature was conducted as discussed below.

Figure 6:
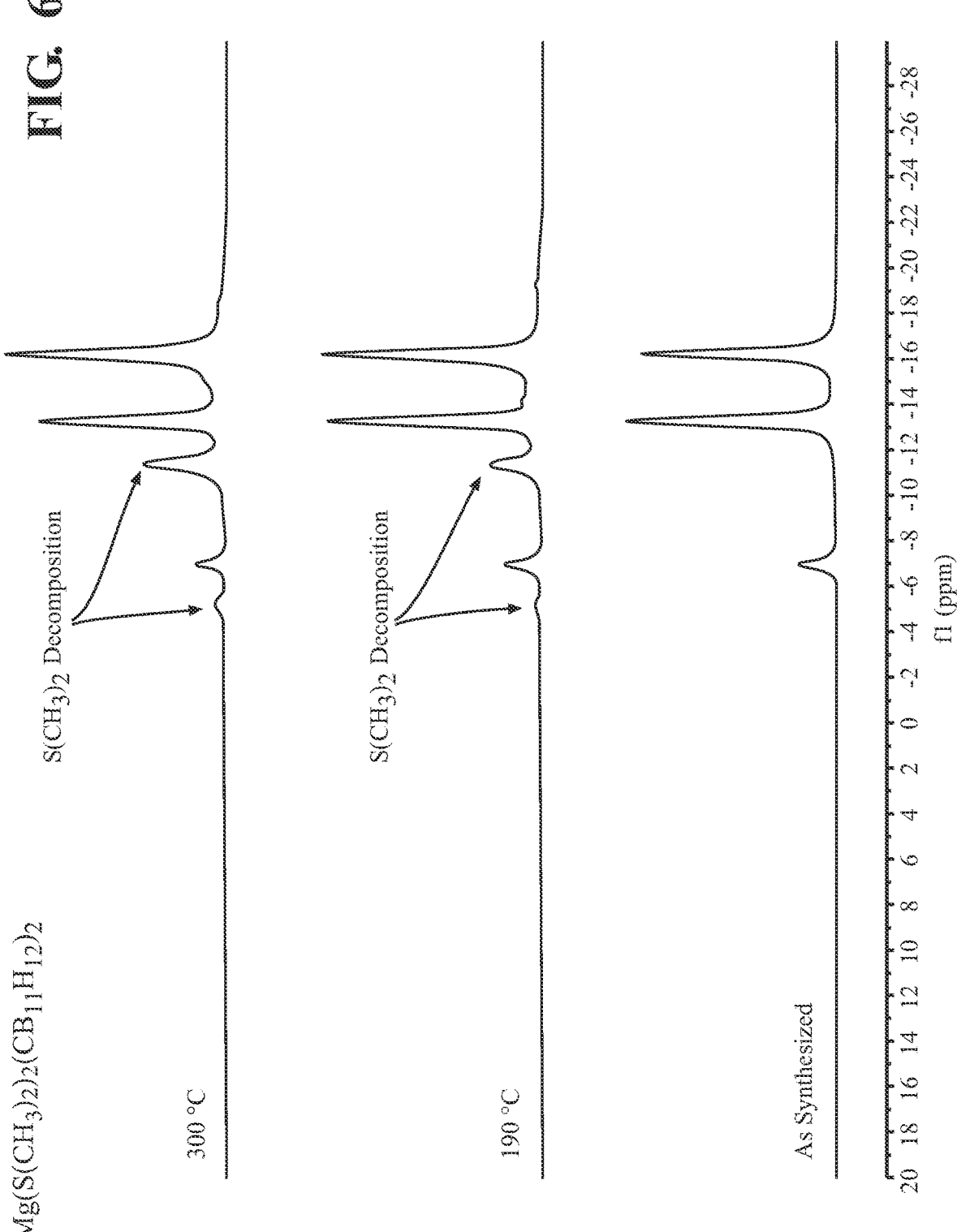
FIG. 6 shows $^{11}B\{^1H\}$ nuclear magnetic resonance (NMR) spectra for $Mg(S(CH_3)_2)_2(CB_{11}H_{12})_2$ (in DMSO-$d_6$) as synthesized, after heating to 190° C., and after heating to 300° C.

Referring to FIG. 6, $^{11}B\{^1H\}$ NMR spectra of $Mg(S$ $(CH_3)_2)_2(CB_{11}H_{12})_2$ (in DMSO-$d_6$) as synthesized, after being heated to 190° C. and cooled to room temperature, and after being heated to 300° C. and cooled to room temperature are shown. And as observed by comparing the three $^{11}B\{^1H\}$ NMR spectra in FIG. 6, reaction between $S(CH_3)_2$ and the $CB_{11}H_{12}$ anion occurred when $Mg(S(CH_3)_2)_2$ $(CB_{11}H_{12})_2$ was heated to 190° C. and 300° C. It should be understood that DMSO-$d_6$ (dimethyl sulfoxide-$d_6$) was used solely as a carrier during NMR spectroscopy discussed herein and was brought into contact with a sample only after the sample was cooled to room temperature.

Figure 7:
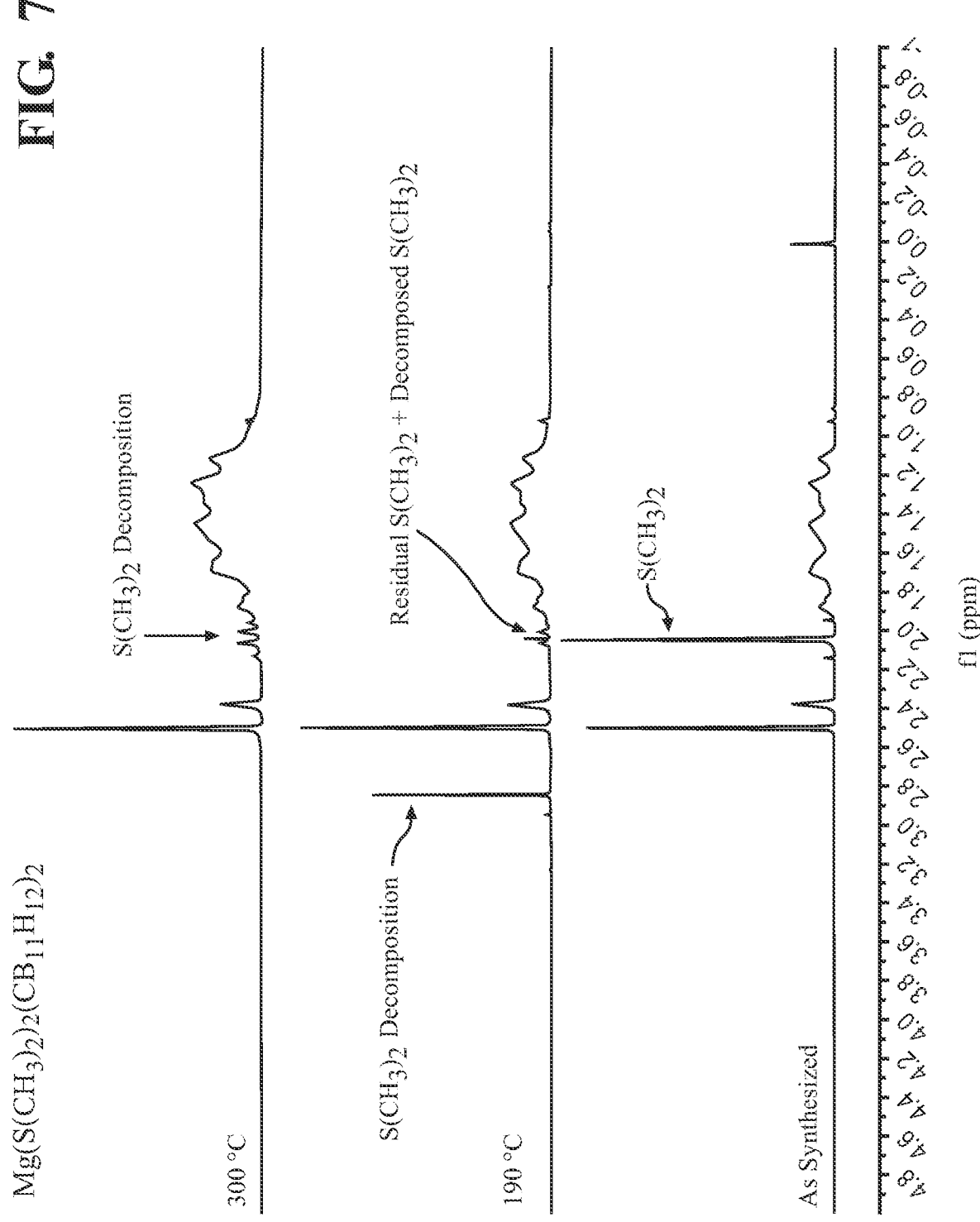
FIG. 7 shows $^1H$ NMR spectra for $Mg(S(CH_3)_2)_2$ $(CB_{11}H_{12})_2$ (in DMSO-$d_6$) as synthesized, after heating to 190° C., and after heating to 300° C.

Referring to FIG. 7, $^1H$ NMR spectra of $Mg(S(CH_3)_2)_2$ $(CB_{11}H_{12})_2$ (in DMSO-$d_6$) as synthesized, after being heated to 190° C. and cooled to room temperature, and after being heated to 300° C. and cooled to room temperature are shown. And as observed by comparing the three $^1H$ NMR spectra in FIG. 7, residual and decomposed $S(CH_3)_2$ was observed when $Mg(S(CH_3)_2)_2(CB_{11}H_{12})_2$ was heated to 190° C. and only $S(CH_3)_2$ decomposition was observed when the $Mg(S(CH_3)_2)_2(CB_{11}H_{12})_2$ was heated to 300° C. That is, the $^1H$ NMR spectra in FIG. 7 show that when the $Mg(S(CH_3)_2)_2(CB_{11}H_{12})_2$ was heated to 190° C., residual $S(CH_3)_2$ was present and a reaction between the solvent $S(CH_3)_2$ and the salt $Mg(CB_{11}H_{12})_2$ occurred, and heating the $Mg(S(CH_3)_2)_2(CB_{11}H_{12})_2$ to 300° C. removed any residual $S(CH_3)_2$ but also resulted in additional reaction between the solvent $S(CH_3)_2$ and the salt $Mg(CB_{11}H_{12})_2$ producing reaction product that was not removed.

Accordingly, it should be understood from FIGS. 1-7C that removal of organic solvents from Mg closo-borate salts is problematic.

Figure 8:
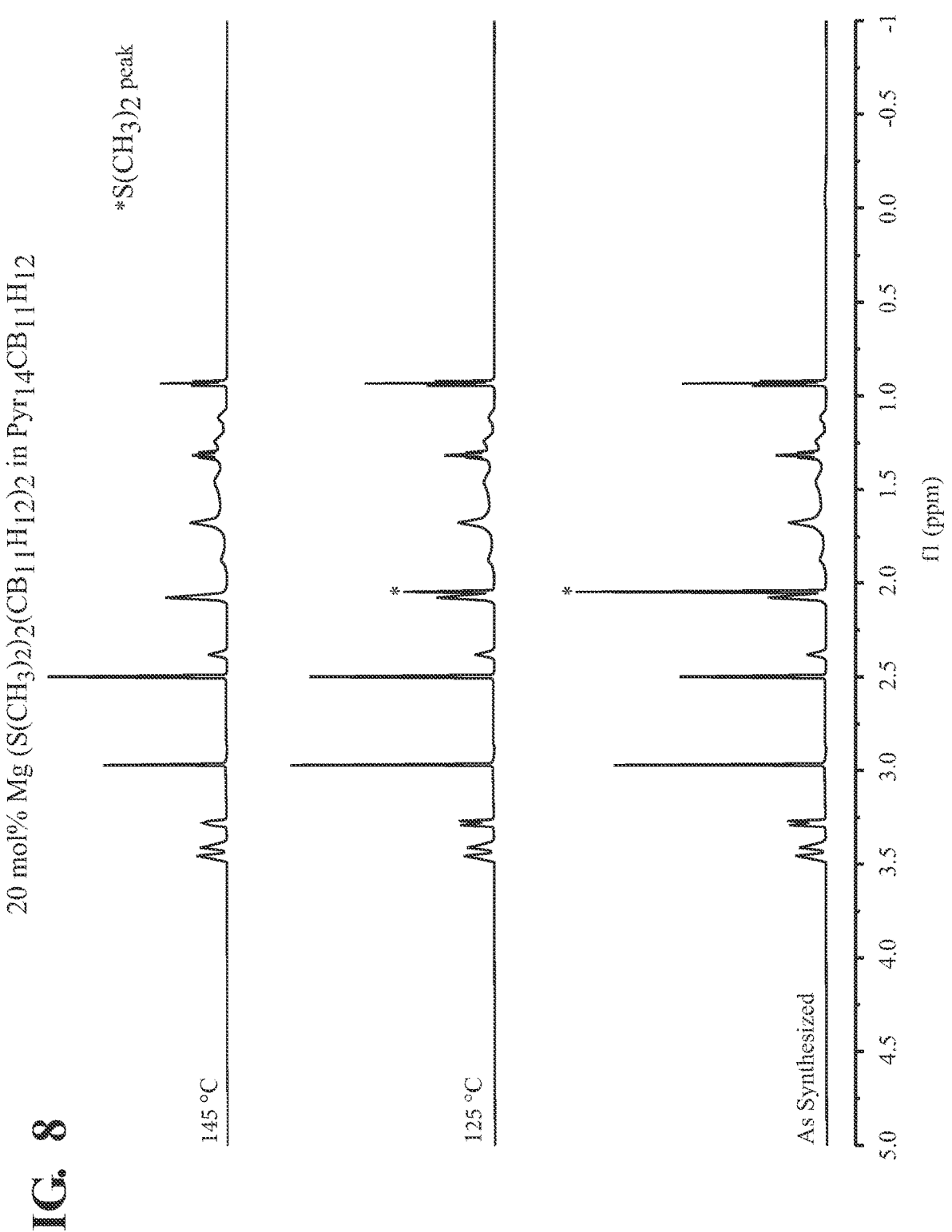
FIG. 8 shows $^1H$ NMR spectra of 20 mol % $Mg(S(CH_3)_2)_2(CB_{11}H_{12})_2$ combined with 1-butyl-1-methylpyrrolidinium closo-carborate salt $(Pyr_{14}CB_{11}H_{12})$ as synthesized, after heating to 125° C. for 45 minutes and cooled to room temperature, and after heating to 145° C. for 48 hours and cooled to room temperature.

In contrast, FIG. 8 shows 1H NMR spectra illustrating removal of $S(CH_3)_2$ from $Mg(S(CH_3)_2)_2(CB_{11}H_{12})_2$ using a synthesis route according to the teachings of the present disclosure are shown. Particularly, FIG. 8 shows 1H NMR spectra for 20 mol % $Mg(S(CH_3)_2(CB_{11}H_{12})_2$—80 mol % $Pyr_{14}CB_{11}H_{12}$ (in DMSO-$d_6$) as synthesized, after heating to 125° C. for 45 minutes, and after heating to 145° C. for 48 hours. And as observed in FIG. 8, the $S(CH_3)_2$ peak was significantly reduced when the 20 mol % $Mg(S(CH_3)_2$ $(CB_{11}H_{12})_2$—80 mol % $Pyr_{14}CB_{11}H_{12}$ was heated to 125° C. for 45 minutes and was not present when the 20 mol % $Mg(S(CH_3)_2(CB_{11}H_{12})_2$—80 mol % $Pyr_{14}CB_{11}H_{12}$ was heated to 145° C. for 48 hours. In addition, peaks corresponding to the decomposition of $S(CH_3)$ 2 (as observed in FIGS. 6-7) were not present when the 20 mol % $Mg(S$ $(CH_3)_2$ $(CB_{11}H_{12})_2$—80 mol % $Pyr_{14}CB_{11}H_{12}$ was heated to 125° C. and 145° C.

Accordingly, it should be understood from FIG. 8 that the present disclosure provides a synthesis route for removal of organic solvents from Mg closo-borate salts without adverse reaction(s) between the organic solvent used for synthesis of the Mg closo-borate salt. In addition, the synthesis route removes the organic solvent(s) from the Mg closo-borate salt(s) after mixing the organic solvent/Mg closo-borate salt mixture with an organic cation-anion salt.

Figures 9A, 9B:
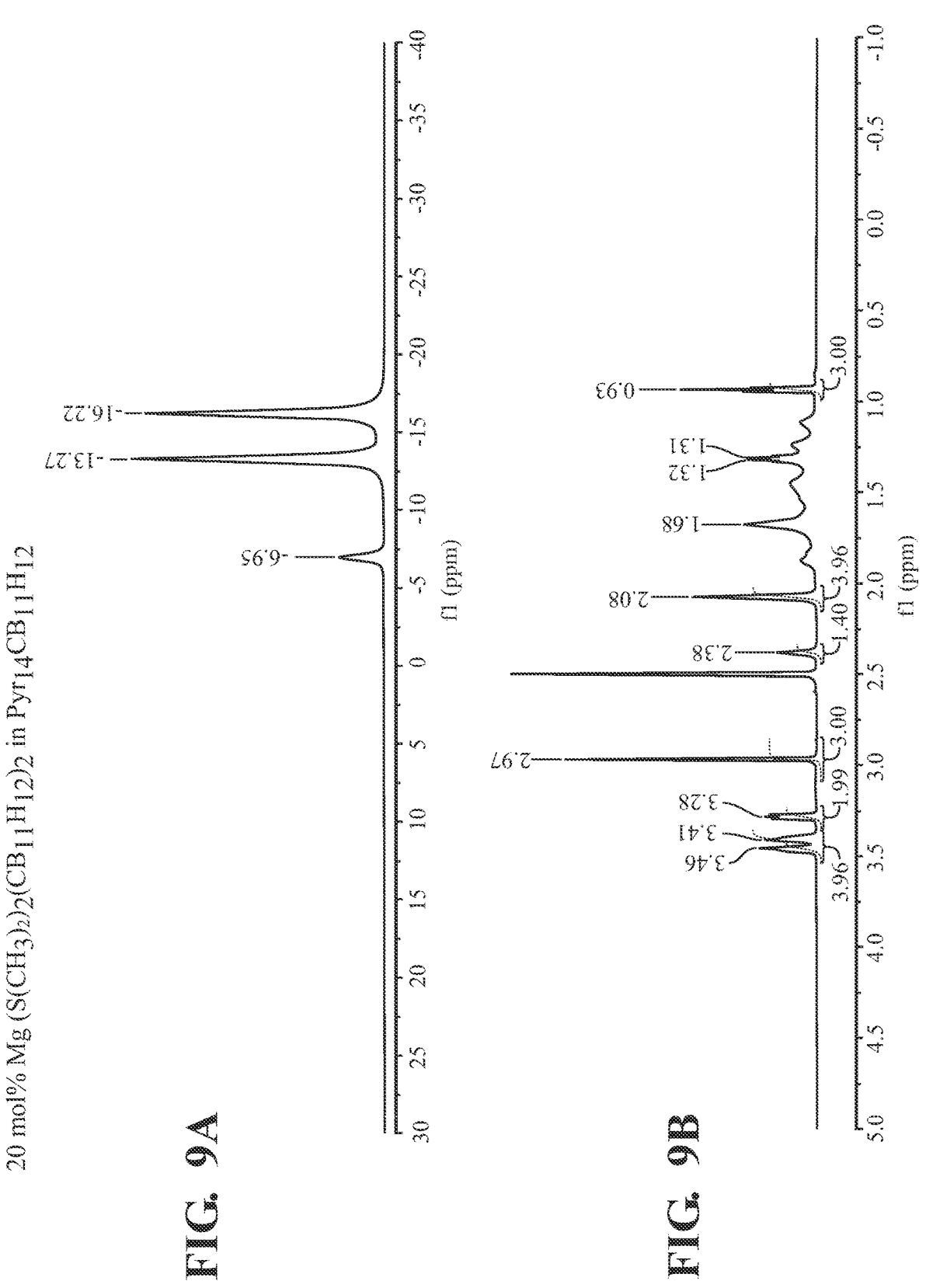
FIG. 9A shows $^1H$ NMR spectrum of 20 mol % solvent free $Mg(CB_{11}H_{12})_2$ combined with $Pyr_{14}CB_{11}H_{12}$ (in DMSO-$d_6$)
FIG. 9B shows $^{11}B\{^1H\}$ NMR spectrum of 20 mol % solvent free $Mg(CB_{11}H_{12})_2$ combined with $Pyr_{14}CB_{11}H_{12}$ (in DMSO-$d_6$)

Referring to FIGS. 9A-9B, final evidence of the removal of the $S(CH_3)_2$ solvent from 20 mol % $Mg(S(CH_3)_2$ $(CB_{11}H_{12})_2$ in $Pyr_{14}CB_{11}H_{12}$ by the procedure described above is shown. Particularly, FIG. 9A shows the absence of reaction between $S(CH_3)_2$ and the $CB_{11}H_{12}$ anion that occurred during the process described above with respect to FIG. 6 and FIG. 9B shows the absence of the $S(CH_3)_2$ solvent peak at 2.03 ppm as observed in FIG. 8, and the absence of $S(CH_3)_2$ decomposition products between the solvent $S(CH_3)_2$ and the salt $Mg(CB_{11}H_{12})_2$ as observed in FIG. 7.

Figure 10:
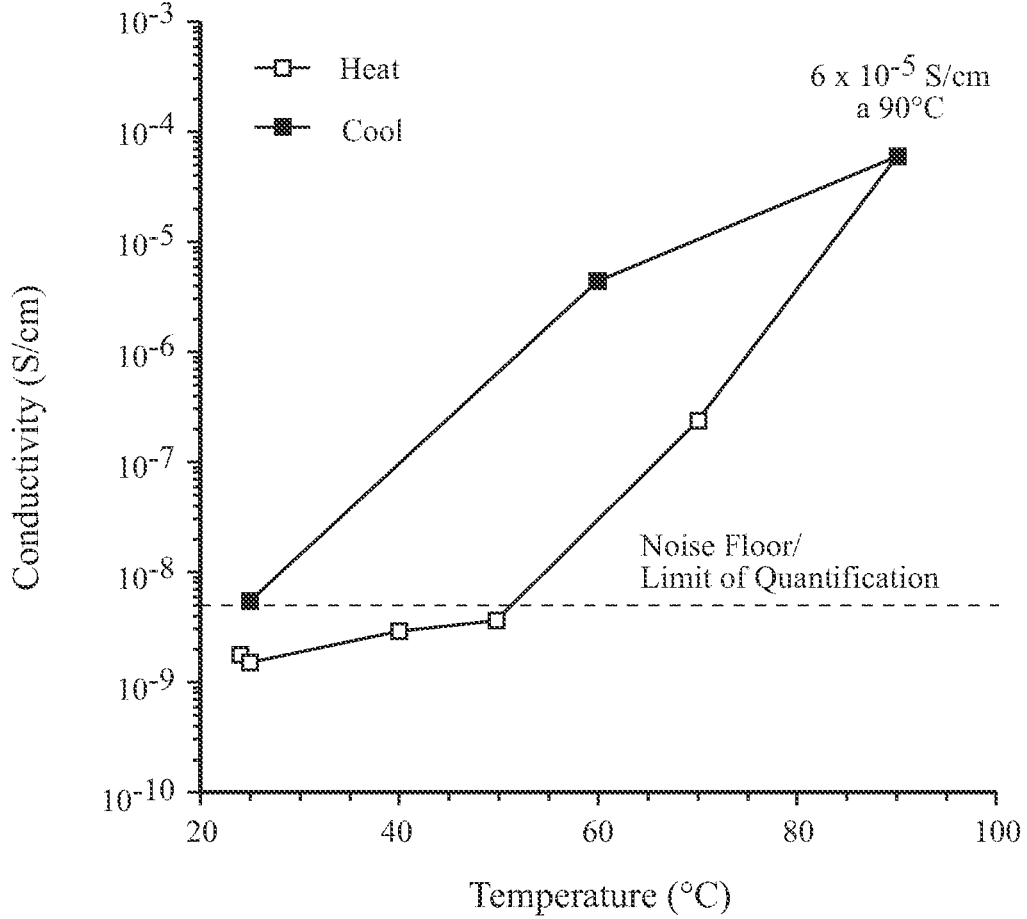
FIG. 10 shows a plot of conductivity vs. temperature for 20 mol % solvent free $Mg(CB_{11}H_{12})_2$ combined with $Pyr_{14}CB_{11}H_{12}$.

Referring to FIG. 10, conductivity measurements of the solvent free 20 mol % Mg $(CB_{11}H_{12})_2$—80 mol % $Pyr_{14}CB_{11}H_{12}$ are shown. Particularly, conductivity measurements on a sample of solvent free 20 mol % Mg $(CB_{11}H_{12})_2$—80 mol % $Pyr_{14}CB_{11}H_{12}$ at 25° C. and 40, 50, 70, and 90° C. during heating to 90° C., and 90, 60, and 25° C. during cooling of the sample from 90° C. to 25° C. And as observed from FIG. 10, the solid solvent free 20 mol % Mg $(CB_{11}H_{12})_2$—80 mol % $Pyr_{14}CB_{11}H_{12}$ electrolyte exhibits enhanced conductivity compared to traditional solvent free Mg electrolytes with a conductivity of about $2\times10^{-7}$ S/cm at 70° C. (during heating), a conductivity of about $6\times10^{-5}$ S/cm at 90° C., and a conductivity of about $5\times10^{-6}$ S/cm at 60° C. (during cooling).

In some variations, the organic solvent can be glutaronitrile or a combination of glutaronitrile and one or more other solvents and can include some succinonitrile. The glutaronitrile can remain in with the magnesium closo-borate salt throughout combination with the organic cation closo-borate to form the composite magnesium closo-borate/organic cation closo-borate salt, with any optional conductivity enhancing salt, and with the organic plastic crystal to form the soft electrolyte. The final proportion of glutaronitrile in the succinonitrile-glutaronitrile mixture of the organic plastic crystal includes any amount introduced during the synthesis and/or isolation of the magnesium closo-borate/organic cation closo-borate salt.

In one form, the present disclosure provides electrolytes for a solid-state electrochemical device, such as a solid-state battery, where the soft electrolyte includes the magnesium closo-borate/organic cation closo-borate salt, an organic plastic crystal and, optionally, a conductivity enhancing salt. The soft electrolytes can include a one or more different closo-borate anions, one or more different organic cations, and optionally one or more conductivity enhancing anions with the organic plastic crystal.

In some variations, the magnesium closo-borate/organic cation closo-borate, and optionally, the conductivity enhancing salts are combined by the mixing of particulate solids or a particulate solid with a waxy solid, which are then mechanically milled or stirred until a fine particulate solid, a fine particulate filled waxy solid, or a waxy solid results. In some instances, ball milling, jet milling and other milling techniques can produce nanoparticles of the salts that are less than 50 nm in cross-section. Heat can be applied to melt and fuse the salts to produce the combined salts into a single combined lattice or solution-like solid, or solid solution, rather than as mixed crystallites of different salts. An organic plastic crystal can be included into the mixture or by the addition of individual components. The form of the electrolyte can be as a solid sheet or film (i.e., in a solid state) that can be molded or otherwise shaped as desired. Temperatures that are employed can be up to or more than 250° C., but generally maintained at temperatures below any magnitude where an undesired transformation occurs, such as a decomposition or reaction of the anions or cations.

In another form, the magnesium closo-borate/organic cation closo-borate, and optionally, the conductivity enhancing salts are present in the liquid state form (i.e., a fully liquid molten state) or mixed-solid liquid state form (i.e., a partially liquid molten state). The conductivity of such liquid/mixed-solid liquid state material is $>10^{-5}$ S/cm at room temperature.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation or particular system is included in at least one form or variation. The appearances of the phrases "in some variations" and "in at least one variation" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method comprising:
    forming a salt mixture in an organic solvent, the salt mixture consisting of a magnesium closo-borate-organic solvent salt and an organic cation closo-borate salt, comprising:
        synthesizing the magnesium closo-borate-organic solvent salt in the organic solvent;
        subsequently mixing or simultaneously synthesizing the organic cation closo-borate salt with the magnesium closo-borate-organic solvent salt in the organic solvent; and
        separating the salt mixture from reaction byproducts of the synthesizing the magnesium closo-borate-organic solvent salt;
    heating the salt mixture such that the organic solvent is removed therefrom; and
    forming a soft solid electrolyte comprising an organic plastic crystal and the organic solvent-free salt mixture by mixing the organic plastic crystal and the salt mixture before or after heating the salt mixture, a content of the organic plastic crystal being from about 10 wt. % to about 70 wt. % of the soft solid electrolyte.

2. The method according to claim 1, wherein the magnesium closo-borate has the structure:

$$Mg(C_yB_{a-y}H_{a-z}X_z)_{(2-(1-y))}$$

Where:

y is 0 or 1;

a is 10 or 12;

z is 0 to a; and

X is independently halogen, alkyl, alkoxy, acyl, aryl, alkylaryl, arylalkyl, and/or aryloxy substituents and wherein alkyl groups can be linear, branched, or cyclic, and wherein any substituent can be partially or fully halogenated.

3. The method according to claim 2, wherein the organic cation closo-borate salt comprises an organic cation selected from ammonium or phosphonium ions of the structure:

$$[(CR^1R^2)_n]_wZ(R^3)_{4-2w}^+$$

where:

n is 4 to 6;

w is 0 to 2;

Z is N or P;

$R^3$ groups are independently $C_1$-$C_8$ alkyl or $C_6$-$C_{10}$ aryl unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched or cyclic; and $R^1$ and $R^2$ groups are independently hydrogen, $C_1$-$C_8$ alkyl, $C_1$-$C_8$ alkoxy, $C_6$-$C_{10}$ aryl, or $C_6$-$C_{10}$ aryloxy, where the carbons are unsubstituted or substituted one or more times with fluorine, alkyl, monofluorinated to perfluorinated alkyl, alkoxy, monofluorinated to perfluorinated alkoxy, phenyl, monofluorinated to perfluorinated phenyl, phenoxy or monofluorinated to perfluorinated phenoxy, and where any alkyl or alkoxy group is linear, branched, or cyclic.

4. The method according to claim 3, wherein the organic cation closo-borate salt comprises a closo-borate anion having the structure:

$$C_yB_{a-y}H_{a-z}X_z^{(-2+y)}$$

where:

y is 0 or 1;

a is 10 or 12;

z is 0 to a; and

X is independently halogen, alkyl, alkoxy, acyl, aryl, alkylaryl, arylalkyl, and/or aryloxy substituents and wherein alkyl groups can be linear, branched, or cyclic, and wherein any substituent can be partially or fully halogenated.

5. The method according to claim 1 wherein the synthesizing the magnesium closo-borate-organic solvent salt comprises:

mixing a protonated amine or phosphine closo-borate with at least one magnesium amide, or magnesium phosphide, magnesium+carbanion, magnesium+silicon anion or magnesium+hydride anion in the organic solvent, wherein the protonated amine or phosphine closo-borate comprises:

at least one protonated ammonia, primary, secondary, or tertiary amine or phosphine of the structure $R^1R^2R^3ZH^+$, where:

Z is N or P; and $R^1$, $R^2$, and $R^3$ are independently hydrogen or a one to ten carbon alkyl, aryl, alkylaryl, trialkylsilyl, or aryldialkylsilyl groups; and at least one closo-borate anion of the structure:

$$C_yB_{a-y}H_{a-z}X_z^{(-2+y)}$$

where:

y is 0 or 1;

a is 10 or 12;

z is 0 to a; and

X is independently halogen, alkyl, alkoxy, acyl, aryl, alkylaryl, arylalkyl, and/or aryloxy substituents and wherein alkyl groups can be linear, branched, or cyclic, and wherein any substituent can be partially or fully halogenated;

wherein the magnesium amide or phosphide has the structure: $R^4R^5Z^-$, where:

Z is N or P; and $R^4$ and $R^5$ are independently a one to eight carbon alkyl, aryl, alkylaryl, trialkylsilyl, or aryldialkylsilyl group;

wherein a reaction between at least one protonated amine or phosphine closo-borate and the magnesium amide or magnesium phosphide forms the magnesium closo-borate; and wherein the separating the salt mixture from the reaction byproducts of the synthesizing the magnesium closo-borate-organic solvent salt comprises removing one or more byproducts from the at least one protonated amine or phosphine and the at least one magnesium amide or phosphide during the heating the salt mixture.

6. The method according to claim 1, wherein the organic plastic crystal comprises a succinonitrile-glutaronitrile mixture.

7. A method comprising:

forming a salt mixture in an organic solvent, and another organic solvent, the another organic solvent comprising an organic plastic crystal, or an individual component thereof, the salt mixture consisting of a magnesium closo-borate-organic solvent salt with an organic cation closo-borate salt, comprising:

synthesizing the magnesium closo-borate-organic solvent salt in the organic solvent;

subsequently mixing or simultaneously synthesizing the organic cation closo-borate salt with the magnesium closo-borate-organic solvent salt in the organic solvent; and separating the salt mixture from reaction byproducts of the synthesizing the magnesium closo-borate-organic solvent salt; and heating the salt mixture and the organic plastic crystal, or the individual component thereof, thereby removing the organic solvent therefrom; and forming a soft solid electrolyte comprising the salt mixture and the organic plastic crystal free of the organic solvent, a content of the organic plastic crystal in the soft solid electrolyte being from about 10 wt. % to about 70 wt. %.

8. The method according to claim 1, wherein the heating the salt mixture is performed at a temperature equal to about 145° C.

9. The method according to claim 1, wherein the heating the salt mixture comprises heating at a pressure of about 1 atmosphere.

10. The method according to claim 1, wherein the organic solvent is dimethyl sulfide.

11. The method according to claim 1, wherein the magnesium closo-borate-organic solvent salt is $Mg(S(CH_3)_2)_2$ $(CB_{11}H_{12})_2$.

12. The method according to claim 1, wherein the organic cation closo-borate salt is $Pyr_{14}CB_{11}H_{12}$.

13. The method according to claim 1, wherein the magnesium closo-borate-organic solvent salt is $Mg(S(CH_3)_2)_2$ $(CB_{11}H_{12})_2$, the organic cation closo-borate salt is $Pyr_{14}CB_{11}H_{12}$, and the heating the salt mixture removes $S(CH_3)_2$ from the $Mg(S(CH_3)_2)_2(CB_{11}H_{12})_2$, and the heating the salt mixture comprises heating to a temperature equal to about 145° C. at a pressure of about 1 atmosphere for a time of about 48 hours.

14. The method according to claim 1, wherein the forming the salt mixture in the organic solvent comprises the simultaneously synthesizing the organic cation closo-borate salt with the magnesium closo-borate-organic solvent salt in the organic solvent.

15. The method according to claim 1, wherein the separating the salt mixture from the reaction byproducts of the synthesizing the magnesium closo-borate-organic solvent salt comprises precipitation of the salt mixture from the organic solvent.

16. The method according to claim 7, wherein the forming the salt mixture in the organic solvent comprises the simultaneously synthesizing the organic cation closo-borate salt with the magnesium closo-borate-organic solvent salt in the organic solvent.

17. The method according to claim 7, wherein the organic plastic crystal, or the individual component thereof, is introduced to the organic solvent during: the synthesizing the magnesium closo-borate-organic solvent salt and/or the separating the salt mixture from the reaction byproducts of the synthesizing the magnesium closo-borate-organic solvent salt.

18. The method according to claim 7, wherein the separating the salt mixture from the reaction byproducts of the synthesizing the magnesium closo-borate-organic solvent salt comprises precipitation of the salt mixture from the organic solvent.

19. The method according to claim 7, wherein the heating the salt mixture and the organic plastic crystal, or the individual component thereof, is performed at a temperature equal to 145° C.

20. The method according to claim 7, wherein the magnesium closo-borate-organic solvent salt is $Mg(S(CH_3)_2)_2$ $(CB_{11}H_{12})_2$, the organic cation closo-borate salt is $Pyr_{14}CB_{11}H_{12}$, and the heating the salt mixture and the organic plastic crystal, or the individual component thereof, removes $S(CH_3)_2$ from the $Mg(S(CH_3)_2)_2(CB_{11}H_{12})_2$, and the heating the salt mixture and the organic plastic crystal, or the individual component thereof, comprises heating to a temperature equal to about 145° C. at a pressure of about 1 atmosphere for a time of about 48 hours.

* * * * *